United States Patent [19]

Tone

[11] Patent Number: 4,604,688
[45] Date of Patent: Aug. 5, 1986

[54] ADDRESS TRANSLATION BUFFER CONTROL SYSTEM

[75] Inventor: Hirosada Tone, Fuchu, Japan

[73] Assignee: Fujitsu Limited, Kawasaki, Japan

[21] Appl. No.: 509,868

[22] Filed: Jun. 30, 1983

[30] Foreign Application Priority Data

Jun. 30, 1982 [JP] Japan ................................. 57-113310

[51] Int. Cl.⁴ ...................... G06F 12/10; G06F 12/14
[52] U.S. Cl. .................................................. 364/200
[58] Field of Search ... 364/200 MS File, 900 MS File

[56] References Cited

U.S. PATENT DOCUMENTS

| 4,038,645 | 7/1977 | Birney | 364/200 |
|---|---|---|---|
| 4,096,573 | 6/1978 | Heller | 364/200 |
| 4,241,401 | 12/1980 | De Ward | 364/200 |
| 4,410,941 | 10/1983 | Barrow | 364/200 |
| 4,430,705 | 2/1984 | Cannavino | 364/200 |
| 4,439,830 | 3/1984 | Chueh | 364/200 |
| 4,481,573 | 11/1984 | Fukunaga | 364/200 |
| 4,500,952 | 2/1985 | Heller | 364/200 |

FOREIGN PATENT DOCUMENTS

0010625A1  9/1979  European Pat. Off. .

OTHER PUBLICATIONS

Drimak et al., "Directory Look-Aside Table Controls", IBM Technical Disclosure Bulletin, vol. 24, No. 2, Jul. 1981, pp. 1266-1267.
Heald, "Address Translation Bypass", IBM Technical Disclosure Bulletin, vol. 18, No. 10, Mar. 1976, pp. 3373-3375.
IBM System/370 Principles of Operation, Fourth Edition (Sep. 1974), pp. 38-39, 105, 107-108 and 110.

Primary Examiner—James D. Thomas
Assistant Examiner—Florin Munteanu
Attorney, Agent, or Firm—Staas & Halsey

[57] ABSTRACT

A computer virtual memory system having a translation lookaside buffer (TLB) in which the result of a dynamic address translation system is stored when in a normal mode or when a non-privileged instruction is executed, but the result is not stored when in a privileged mode or when a privileged instruction is executed, such as a storage key operation. The storage does not occur even though the effective address of the privileged instruction is translated into a physical address.

3 Claims, 4 Drawing Figures

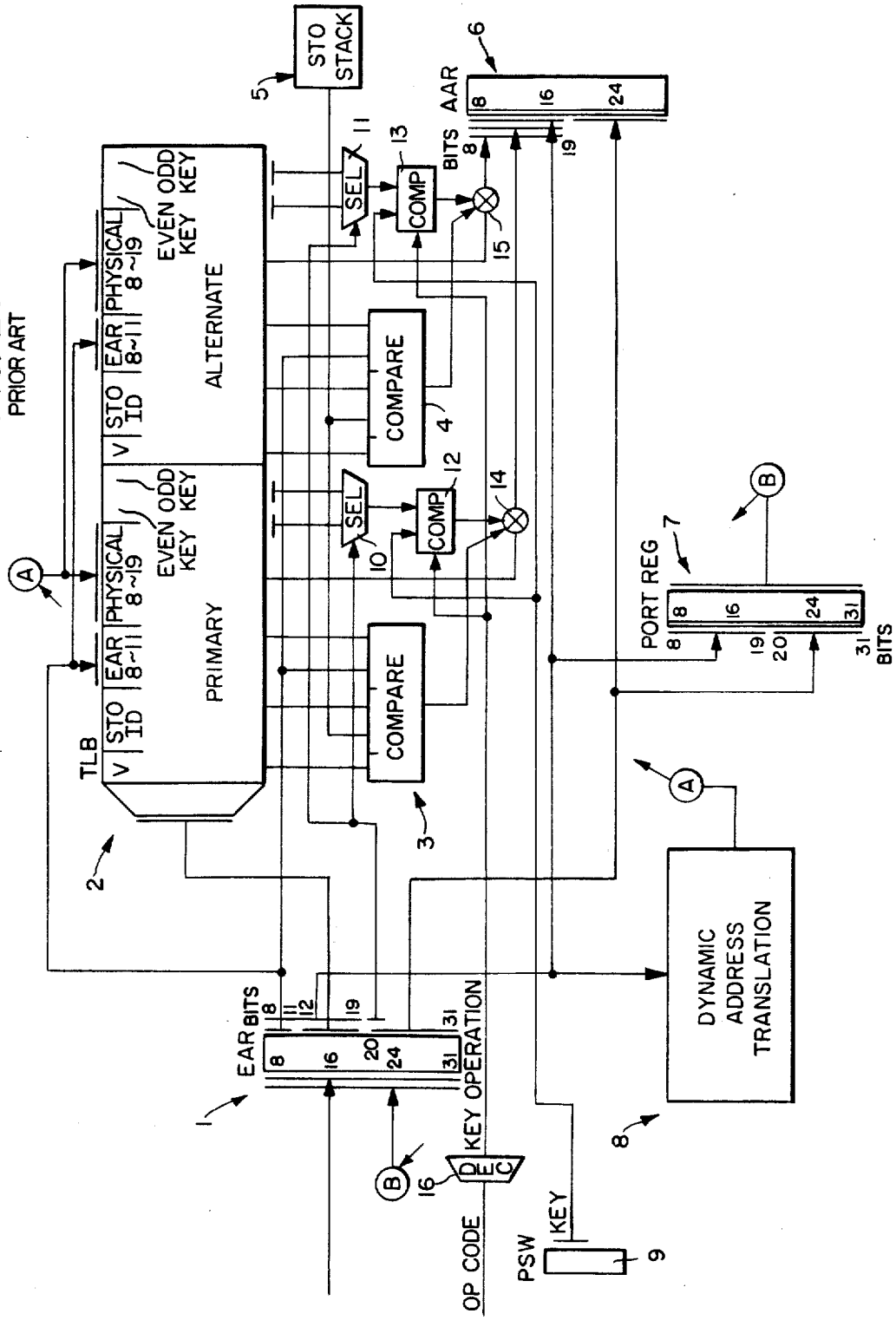

ADDRESS TRANSLATION BUFFER CONTROL SYSTEM

BACKGROUND OF THE INVENTION

1. Field of the Invention

This invention relates to an address translation control system, and, more specifically to an address translation control system in a data processing system providing the function of performing a storage protection check by storing a storage protection key in an address translation buffer such as a Translation Lookaside Buffer (TLB), which executes control in such a way that if the storage protection check is not required, a translated pair of a translation result is not registered in the address translation buffer when the desired translation pair does not exist in the address translation buffer and a dynamic address translation system is utilized.

2. Description of the Related Art

In an existing data processing system employing a multi-virtual storage system, a dynamic address translation system for translating an effective address into a physical address is included. Moreover, also provided is an address translation buffer TLB which stores results, once translated, in the form of a translation pair and the contents of the buffer is utilized for further address translation. The TLB is always used for each execution of a memory access instruction. It is used not only when an effective address is a logical address and it is necessary to translate a logical address into a physical address but also when an effective address is a real address, because the TLB is also utilized for translating a real address into a physical address. The TLB also employs a structure for storing a storage protection key, for protecting storage, which is previously stored on said address translation buffer and a storage protection check is carried out simultaneously with the address translation utilizing the fact that the address translation buffer is indexed or accessed at the same time as a memory access. Namely, even when an effective address is a real address, a translation pair is stored in the address translation buffer together with the storage protection key and the address translation buffer is indexed at the time of memory access by a real address and a check of the storage protection key is carried out. Here, a real address is different from a physical address. A physical address is uniquely assigned to locations within the main storage unit (MSU) hardware. A real address is a virtual physical address for each computer when plural computers or plural virtual computers use the MSU in common. However, some memory access instructions, called privileged instructions, are not required to perform a memory protection check. In the case of above type instruction, an effective address generally means a real address. In such a case, when an address translation buffer hit does not occur, entry of a translation result into the address translation buffer may be an inefficient update of the buffer because the contents of the address translation buffer is replaced by an effective address which does not require a storage protection check. Privileged instructions can change a storage protection key and a storage protection check is not necessary during the execution of such an instruction. Such an instruction is useful in changing the scope of protection. An IBM 370 is a system that includes a storage protection key which requires privileged instructions to change the key.

SUMMARY OF THE INVENTION

This invention is intended to solve above disadvantages, and therefore, includes an address translation control system in a data processing system including an address translation system which translates an effective address into a physical address and an address translation buffer which stores a translation pair of the pertinent translated result and in which a storage protection key is stored in the address translation buffer. The result of a translation obtained when the address translation has been carried out by the address translation system is used directly without storing it in the address translation buffer when the memory access instruction, which does not require the storage protection check based on the protection key by indexing the address translation buffer, is executed.

This invention will now described by referring to the drawings.

BRIEF DESCRIPTION OF THE DRAWINGS

FIG. 2 is a block diagram indicating an address translation control system of the prior art;

DETAILED DESCRIPTION OF THE INVENTION

Figure 1:
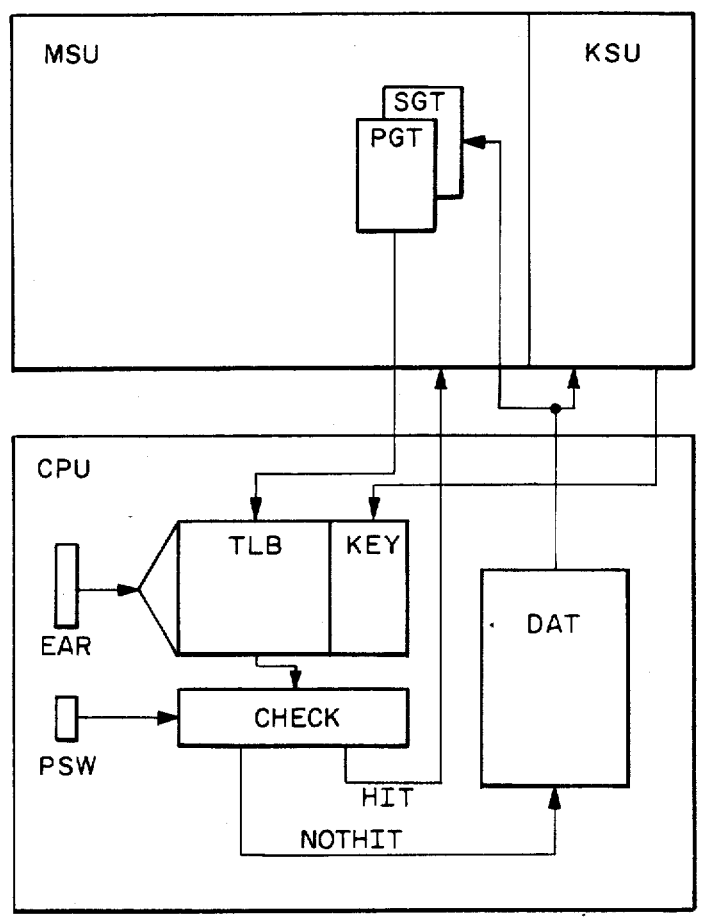
FIG. 1 is a block diagram of a data processing system to which the present invention is applied.

FIG. 1 is an outline of a data processing system on which the present invention is based. A central processing unit CPU provides an address translation buffer TLB. An address in an effective address register EAR is translated into a physical address by the TLB and a protection key KEY check is also performed. The check circuit CHECK determines whether a translation pair corresponding to an address in the EAR is registered in the TLB, and whether the protection key corresponding to the translation pair matches the key (this key is included in the program status word register PSW) of the program which has produced the effective address. When the pertinent translation pair is registered and the key is also matched, it is called a HIT. When the TLB receives a HIT, the main storage MSU is accessed using the TLB output which is a certain physical address. If the TLB is not HIT, a dynamic address translation (DAT) system is started, a corresponding physical address is obtained by indexing into a segment table (SGT) and a page table (PGT) in the main storage unit (MSU) and the translation pair is registered in the TLB. Simultaneously, the storage protection key corresponding to the physical address is obtained from the key storage unit (KSU) and it is also registered into the KEY part of the TLB. Thereafter, the MSU is accessed using a physical address obtained by again indexing into the TLB.

The storage protection key in the KSU is provided for each address region of a specified size in the MSU, for example for each 2K bytes. The address translation is carried out for the addresses of, for example, 4K bytes. In FIG. 2 is a block diagram of a existing TLB. In FIG. 2, 1 is an effective address register into which an effective address is loaded, 2 is an address translation buffer (TLB) consisting of two buffer blocks PRI- MARY and ALTERNATE in order to improve application efficiency in the case shown in the figure, 3 and 4 are comparators, 5 is a segment table origin (STO) stack, 6 is a translation result address register, 7 is a port register, 8 is a DAT system. In addition, 9 is a PSW register in which a program status word is stored, 10 and 11 are selectors, 12 and 13 are key comparators, 14 and 15 are gate devices and 16 is an instruction decoder, respectively.

Each entry of each block in the address translation buffer 2 includes the following information: (i) valid bit V, (ii) segment table origin (STO) ID for controlling multi-virtual storage, (iii) bits "8" to "11" of the effective address, (iv) bit "8" to bit "19" of the physical address corresponding to the effective address, (v) two EVEN and ODD storage protection keys provided for protecting storage corresponding to units of 2K bytes.

As is well known, when the effective address is loaded into the register 1 to execute memory access processings, the address translation buffer 2 is indexed by the 8 bits from the bits "12" to "19" of the effective address. At this time, the effective address bits "8" to "11" in the contents read out of the address translation buffer 2 are compared respectively with the bits "8" to "11" in the comparators 3 and 4. At this time, validity based on the above-mentioned valid bit V is confirmed in the comparators 3 and 4, and the STO ID in the content read out above is collated with the content of the STO stack (not shown).

When the valid bit V indicates validity, the effective addresses of bits "8" to "11" match in the above comparison and STO ID is collated, for example, in the comparator 3, the physical address bits "8" to "19" read from the primary side of the address translation buffer 2 are loaded into the translation result address register 6. On the other hand, the bits "20" to "31" in the effective address register are directly transferred to the translation result register 6. As a result, the physical address bits "8" to "31" are loaded as the translation result into the translation result register 6 and can be used for memory access. At this time, the total content of effective address register 1 is saved into the port register 7 for use for a re-access when there is no desired translation pairs in the address translation buffer 2.

If there is no address translation address, that is no HIT, as a result of the indexing of said address translation buffer 2, the dynamic address translation system 8 is started in accordance with the content of the effective address register 1. As is proposed in the prior art, the physical addresses corresponding to effective addresses are extracted through complicated processing and a result of the processing is stored in the address translation buffer 2 (through the path A). The stored content is read when content of port register 7, which has been saved as explained above, is loaded into the effective address register 1 (through the path B) and, as a result, the content of address translation buffer 2 is indexed again and the desired physical addresses is loaded into the result register 6.

The above-described operations are already known in data processing systems employing a virtual storage system and even when the effective address is a real address, the address translation buffer 2 is indexed for the translation of the real address into the physical address and the storage protection check based on the storage protection key is performed.

There is an instruction used for making access to the key of KSU which is a type of memory access instruction. This instruction is generally called a privileged instruction, does not require a key check and its effective address is a real address. But the TLB index is also necessary for translation into a physical address from the real address.

The existing conventional operations of such key instructions will be described with reference to FIG. 2. Whether a current instruction is a key instruction is determined by decoding the operation code in an instruction register using decoder 17. When the instruction decoded is a key instruction, the key comparators 12 and 13 are forcibly set into a matching state, and only the comparators 3 and 4 are operated. When the effective address results in a HIT in the TLB, there is no problem to be considered. IF a HIT does not occur, as in the case of the ordinary memory access instructions, a physical address is obtained through the DAT system, the result is registered in the TLB, is and a physical address obtained by repeated index to TLB used. There is no need or requirement for registering the keys in the TLB for a key instruction, however, in the conventional systems a key is obtained anyway by making an access to the KSU to make the operation common or consistent with ordinary instructions and then the key is registered in the TLB. Usually, the key has a particular value, for example, all zeros.

In general, the TLB is provided and operated based on a rule of experience that the adjacent addresses of a logical address are often accessed continuously or repeatedly, and the TLB is very effective when the same address translation pair is used many times. However, a key instruction has small appearance or low execution frequency. If a key instruction is executed continuously or repeatedly, but the address to be accessed skips or differs from the previous address by a full unit of address translation, namely in units of 2K bytes to 4K bytes, the same address translation pair is rarely used continuously or repeatedly. Moreover, a key check is also not required as described above. If the address translation pair used for this key instruction is newly registered in the TLB, one translation pair which has been previously used must be nullified and the translation pair could be a high execution frequency pair. Accordingly, translation pairs having a high possibility of reuse eliminated and other translation pairs having a low probability of repeated use are registered in the TLB, resulting in a deterioration of the use efficiency of the TLB.

Figure 3:
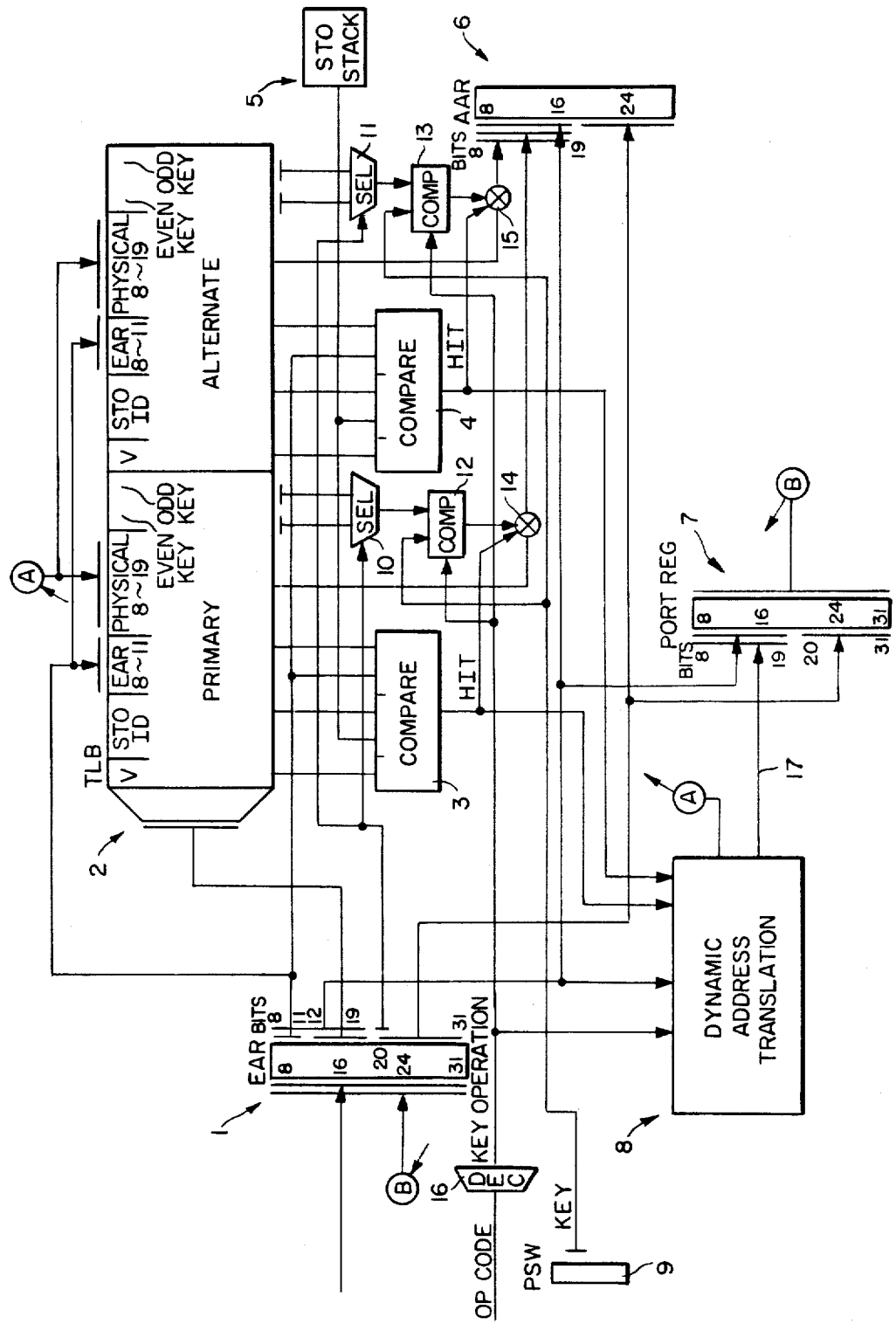
FIG. 3 is a block diagram of an address translation control system in an embodiment of the present invention.

The present invention eliminates the above disadvantage of the prior art by eliminating registeration into the TLB of the address translation pairs for the key instruction. FIG. 3 depicts an embodiment of the present invention. In this figure, reference number 1 to 16 correspond with those of FIG. 2. The structure shown in FIG. 3 is different from that shown in FIG. 2 in that the path for loading an output of the dynamic address translation system 8 into the port register 7 is added and shown as 17.

When an ordinary operation is executed, namely a storage protection check based on the storage protection key, by indexing the address translation buffer 2, the operations are exactly the same as those described for FIG. 2. Therefore, these operations are not again described again. In the case of key instruction according to the present invention, processings are executed as described below.

As in the case of the ordinary instruction, first, an effective address is loaded into an effective address register 1, the address translation buffer 2 is indexed, a physical address is loaded into the translation result address register 6 when the desired translation pair exits, namely there is a HIT. In this case, however, the result of a check by the storage protection key is neglected as described above.

If there is not a HIT, the dynamic address translation system 8 is started, and a desired physical address is extracted or produced. This DAT operation procedure is also the same as that in the above storage protection check mode. However, in the processing procedure when addresses are not in the HIT state, after a physical address is extracted from the dynamic address translation system 8, the result is overridden or forced into the bits "8" to "19" of port register 7. That is, the physical address is not stored in the address translation buffer 2, which is different from the storage protection check mode. The translation result is loaded into the effective address register 1 from the port register 7 and then transferred to the translation result register 6.

Figure 4:
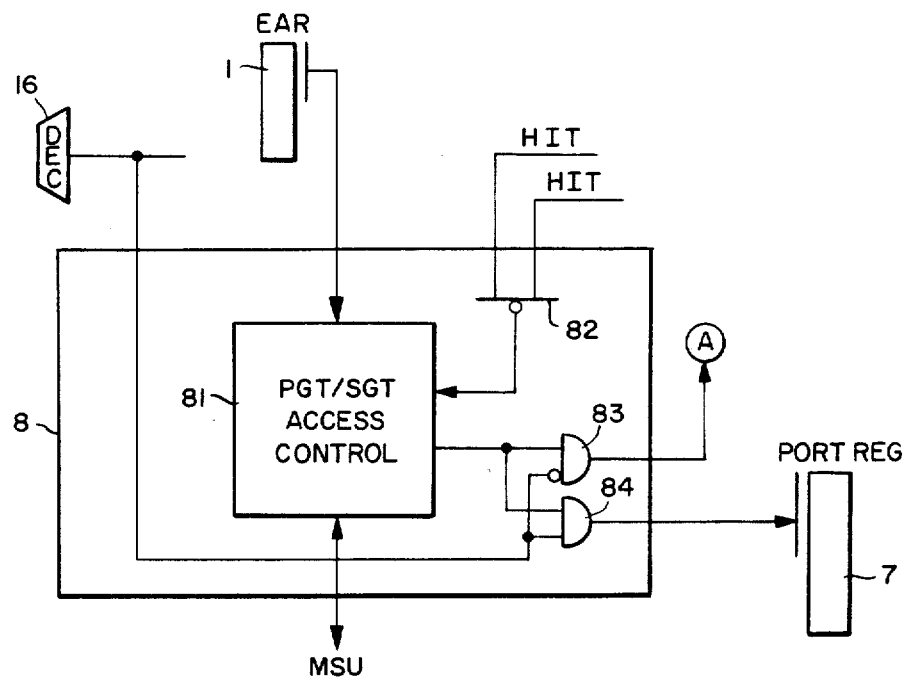
FIG. 4 is a block diagram of an embodiment of the dynamic address translation (DAT) system in FIG. 3.

FIG. 4 is an embodiment of the DAT system of FIG. 3. If the HIT signal is not output from comparators 3 or 4, access means 81 of the page table and segment table is started by the NOR gate 82 and thereby the DAT procedure is carried out. When the signal sent from the decoder 16 indicates an instruction other than the key instruction, the physical address obtained as a result of DAT is transmitted to the path A through the AND gate 83. When a key instruction is decoded, the physical address is sent to the PORT register 7 through the AND gate 84.

As described above, this invention provides a very efficient address translation system wherein the content of the address translation buffer is prevented from being undesirably or unnecessarily replaced, when the translation pair generated at the time of a memory access based on the effective address does not require a storage protection check.

I claim:

1. An address translation control system for storage access instructions including a first instruction requiring a storage protection check prior to storage accessing and a second instruction not requiring a storage protection check prior to storage accessing, said system comprising:
    an effective address register for storing an effective address;
    a decoder for decoding the storage access instructions;
    a result register, connected to said effective address register, for storing a physical address;
    translation buffer means, connected to said effective address register, said decoder and said result register, for storing physical addresses corresponding to effective addresses and for providing a hit signal when the physical address corresponding to the effective address stored in the effective address register is stored therein and the storage protection check is successful, and for providing the physical address to said result register as a result of the hit signal;
    dynamic address translation means, connected to said effective address register, said decoder and said translation buffer means, providing a physical address in dependence on the first or second instruction being decoded and providing the physical address to said translation buffer means in dependence upon the first instruction being decoded; and
    a port register, connected to said effective address register and said dynamic address translation means, for passing the physical address directly to said effective address register from said dynamic address translation means in dependence upon the second instruction being decoded.

2. A system as recited in claim 1, wherein said dynamic address translation means comprises:
    page/segment table means, connected to said effective address register, for providing the physical address based on the effective address;
    first gate means, connected between said translation buffer means and said page/segment table means, for receiving the hit signal and providing an no-hit signal, when the hit signal is not received, actuating said page/segment table means; and
    second gate means, connected to said decoder, said page/segment table means, said port register and said translation buffer means, for gating the physical address to said port register or said translation buffer means in dependence on which of the first or second instructions is decoded.

3. An address translation control system in a data processing system, comprising:
    address translation system means for translating an effective address into a physical address;
    address storing buffer means for translating pairs of translated results and having a storage protection key associated with each pair; and
    control means for providing a storage protection check mode where a storage protection check based on said storage protection key stored in said address translation buffer means is performed and a non-check mode where a storage protection check based on said storage protection key stored in said address translation buffer means is not performed, for controlling said address translation system means and said address translation buffer means when address translation is carried out by said address translation system means where the translation result is used after being stored in said address translation buffer means and being read out from said address translation buffer means during said storage protection check mode, and for controlling the address translation system means and said address translation buffer means when address translation is carried out by said address translation system means where the translation result is used directly without being stored in said address translation buffer means during said non-check mode.

* * * * *

UNITED STATES PATENT AND TRADEMARK OFFICE
CERTIFICATE OF CORRECTION

PATENT NO. : 4,604,688

DATED : August 5, 1986

INVENTOR(S) : HIROSADA TONE

It is certified that error appears in the above-identified patent and that said Letters Patent is hereby corrected as shown below:

Col. 3, line 58, "is" should be --are--.

Col. 4, line 15, "IF" should be --If--;

line 18, delete ", is";

line 19, after "TLB" insert --is--;

line 50, "registeration" should be --registration--.

Col. 6, line 23, "an" should be --a--;

line 36, "storing" should be --translation--;

"translating" should be --storing--.

Signed and Sealed this
Fourth Day of November, 1986

[SEAL]

*Attest:*

DONALD J. QUIGG

*Attesting Officer*     *Commissioner of Patents and Trademarks*